July 1, 1952 V. A. LARSEN 2,601,967
FLUID VALVE
Filed March 22, 1949
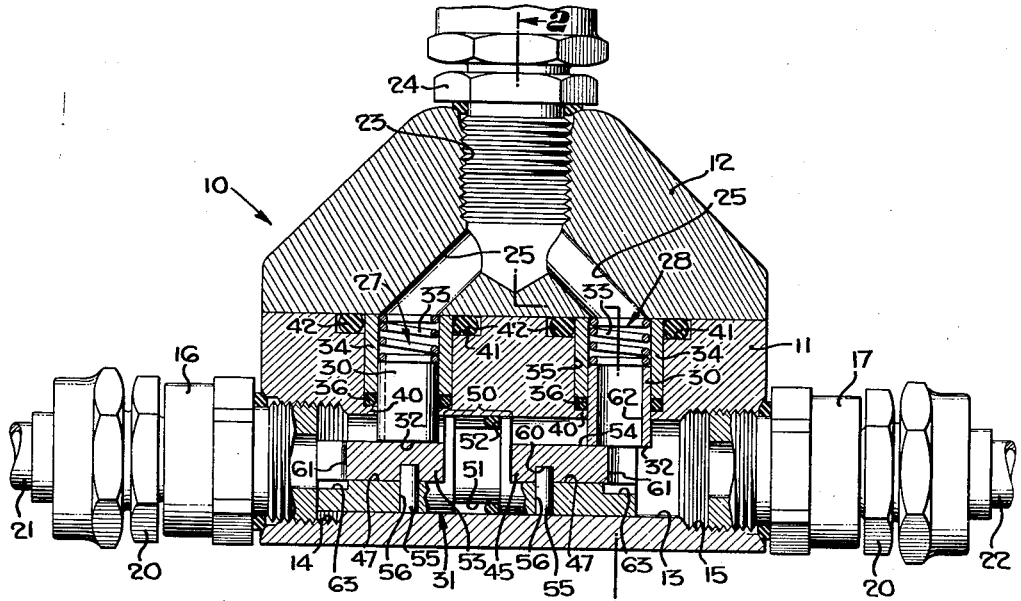
Fig.1.
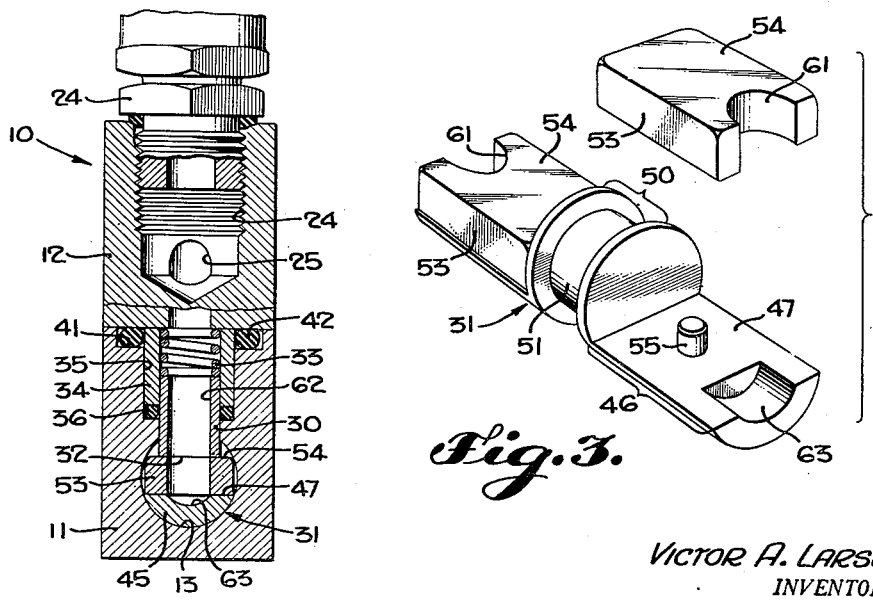
Fig.2.
Fig.3.
VICTOR A. LARSEN,
INVENTOR.
BY Forrest J. Lilly
ATTORNEY Patented July 1, 1952

2,601,967

UNITED STATES PATENT OFFICE 2,601,967

FLUID VALVE

Victor A. Larsen, Altadena, Calif., assignor to Saval Division of The William R. Whittaker Company, Ltd., Los Angeles, Calif., a corporation of California Application March 22, 1949, Serial No. 82,830

2 Claims. (Cl. 251—118)

The present invention relates generally to fluid valves, and more particularly to that class of valves wherein a generally cylindrical valve member having a port formed therein slides within a cylindrical bore in the valve body between two operating positions. Fluid passages in the valve body intersect the bore and are closed by the valve member when the same is in one of said positions, or uncovered by the port in the valve member when the same is in the other position. Associated with said passages are axially movable, spring-pressed seat rings that bear against the valve member in sealing contact therewith.

The advantages of using a cylindrical valve member within a cylindrical bore in the valve body lie in the fact that such cylindrical shapes lend themselves well to close-tolerance production; while sealing against leakage past the valve member is easily and inexpensively accomplished by use of the well-known O-rings. On the other hand, good sealing contact between the end of the seat ring and the valve member can only be obtained when the mating surfaces are absolutely flat and lapped to an optically flat finish. To obtain a flat surface on a cylindrical valve member operating within a cylindrical bore, it is necessary to form a recess in one side of the member, but the difficulty then is that such a recessed surface is almost impossible to lap, owing to the presence of the shoulders rising from one or both ends of the flat surface.

The primary object of the present invention, therefore, is to provide an inexpensive and practical solution to this problem whereby a recessed flat surface having a lapped finish can be produced in a cylindrical valve member. This object is attained by milling or otherwise machining a flat, recessed surface of ordinary finish on the cylindrical valve member, and then mounting on said recessed surface a flat plate of hardened steel which has been ground and then lapped to an optically flat finish.

Another object of the invention is to provide a valve having good sealing characteristics suitable for conditions ranging from very low to extremely high pressures. A further object is to provide a valve having a low coefficient of friction between the sliding valve member and the stationary valve seat. This low coefficient of friction results from the fact that the seat ring is also formed of hardened steel, and its contacting end surface is likewise lapped, giving a hardened lapped surface sliding on another hardened lapped surface.

Still another object of the invention is to provide a new and improved shuttle valve designed particularly for use in aircraft hydraulic systems, whereby the system is switched automatically to an emergency source of fluid pressure to operate landing gear, flaps, etc., in the event of failure of the primary source.

The foregoing and other objects and advantages of the present invention will become apparent to those skilled in the art upon consideration of the following detailed description of the preferred embodiment thereof, reference being had to the accompanying drawings, wherein:

Figure 1 is a vertical median section through a shuttle valve embodying the principles of the invention;

Figure 2 is another section through the same, taken along the line 2—2 in Figure 1; and Figure 3 is a perspective view of the shuttle assembly, showing one of the hardened and lapped plates lifted away from the cylindrical valve member.

In the drawings, the shuttle valve is designated in its entirety by the reference numeral 10, and is seen to comprise a body 11 having a cover 12 attached thereto. The valve body 11 is generally rectangular in shape as seen from the side, and extending longitudinally through the same from one end to the other is a cylindrical bore 13 having threaded portions 14 and 15 at opposite ends thereof to receive fittings 16 and 17. The fittings 16 and 17 constitute inlet ports for the valve, and attached to said fittings by couplings 20 are hydraulic lines 21 and 22; one of which is connected to the primary source of fluid pressure on the aircraft, and the other being connected to an emergency source of fluid pressure.

The fluid outlet for the valve 10 is a tapped hole 23 extending downwardly into the cover 12 from the top side thereof, and screwed into this hole is a coupling member 24. The hydraulic line carrying fluid from the valve to the actuating mechanism of the system is connected to the outlet 23 by the coupling member 24. Opening into the bottom of the hole 23 are two passageway 25, which diverge downwardly and open into fluid passages 27 and 28.

The fluid passages 27, 28 intersect the bore 13 at right angles thereto, and associated with each passage is an axially movable seat member 30 which cooperates with a shuttle assembly 31 that is slidably disposed within the bore 13. Each of the seat members 30 is in the form of a cylindrical sleeve of hardened steel, the bottom end 32 of which is ground and lapped. Bearing downwardly against the top end of the sleeve 30 is a spring 33, the upper end of which abuts against the bottom face of the cover 12 around the margin of the passage 25.

The seat member 30 is slidably disposed within a sleeve 34 which is fitted into a hole 35 in the valve body. Confined within the hole 35 at the bottom end of the sleeve 34 is an O-ring seal 36 which rests on a lip 40 projecting radially inwardly at the bottom of the hole. The lip 40 and sleeve 34 cooperate to form an annular recess in which O-ring seal 36 is contained; it being an easier production matter to drill a hole downwardly through the valve body into the bore 13, then counterbore the hole 35 leaving the lip 40, and finally fit a sleeve 34 in the counterbore, than it is to cut a circumferential groove on the inside of a hole of the small diameter involved. Shallow counterbores 41 are recessed into the top surface of the valve body 11 concentric with the fluid passages 27, 28, and seated therein are O-ring seals 42 which are squeezed lightly between the bottom surfaces of the counterbore and the underside of the cover 12.

The shuttle assembly 31 consists primarily of a valve member 45 having the shape of a cylinder, the end portions 46 of which have been cut away on top to provide flat, plate-supporting surfaces 47 lying in a horizontal plane parallel to the axis of the members. The center portion 50 of the valve member 45 is fully cylindrical, and is grooved circumferentially at 51 to receive an O-ring seal 52 of synthetic rubber, which seals the clearances between the valve member and the body 11 against leakage past the center portion.

Mounted on top of the horizontal surfaces 47 of the valve member are flat plates 53 of hardened steel, the top surfaces 54 of which have been ground and lapped to an optically flat finish. Each of the plates 53 is secured against relative movement with respect to the valve member 45 by means of a pin 55 which is secured within a hole 56 in the end portions 46 of the valve member, and projects upwardly from the plate supporting surface 47. The projecting top end of the pin 55 is received within a socket 60 in the underside of the plate 53, and the latter is thereby constrained against transverse or longitudinal movement with respect to the valve member, although being readily separable therefrom when the plate is lifted straight up from the surface 47.

Cut back into the outer end of each of the plates 53 is a semi-circular recess or port 61 which is adapted to register with the opening 62 in the seat member 30 when the shuttle is at one end of the bore 13, thereby opening the associated passage 27 or 28 so that fluid entering the bore from that end of the valve body has an exit through the passage to the outlet 23. When the shuttle is at the other end of the bore, the opening 62 is covered by the solid end of the plate 53, and the passage is then closed to the flow of fluid. One important relationship which should be brought out at this point is that the ports 61 in the shuttle are spaced apart so that either one of the seat members 30 is fully closed by its plate 53 before the other is cracked open. This prevents the interflow of fluid from one of the ports 16, 17 to the other, which might occur if both of the ports were open at the same time. Should such interflow occur, particularly in a system wherein the emergency pressure source is a hand pump, the rate of leakage to the disabled line might exceed the output of the pump, with the result that the shuttle would remain in an intermediate position, and no fluid pressure could be built up and transmitted through the outlet 23 to the operating mechanism.

In Figure 1, the shuttle assembly 31 is at the left hand end of the bore 13, and the opening 62 in the right hand seat member 30 of passage 28 is registered with the recess 61 of its plate, so that fluid entering the valve body through the right hand inlet 17 passes outwardly through the fluid passage 28 to the outlet 23. The seat member 30 of the other fluid passage 27 is seated on the solid portion of the plate 53, closing passage 27. The condition just described is reversed when the shuttle assembly 31 is at the right hand end of bore 13.

The radius of the recess 61 is approximately the same as the inside radius of the member 30, and the latter is thus supported at its bottom end around the margins of the recess. It will also be noted that the end portions 46 of the valve member are recessed at 63 to increase the area of the opening in the shuttle assembly through which the fluid flows on the open side of the valve.

Assuming that the right hand inlet 17 is connected to the normal source of fluid pressure, the shuttle assembly 31 will normally be at the left hand end of the bore 13, as shown, with its end abutting against the end of fitting 16. In this condition, the right hand fluid passage 28 is opened, and fluid entering the right hand end of bore 13 through the inlet 17 flows outwardly through passage 28 to the outlet 23. Normally, there will be no pressure in line 21, hence the shuttle assembly 31 is held over to its left hand position by the fluid pressure acting against the right hand end thereof. Leakage past the center portion 50 of the shuttle assembly is prevented by the O-ring 52, while O-rings 36 prevent leakage around the outside of the seat members 30. The seat members 30 are resiliently urged downward against the plate 53 of the shuttle assembly by the springs 33, holding the lapped bottom end surfaces 32 of the seat members against the lapped surface 54 of the plates in sealing contact therewith. It will be understood, of course, that an actual seal between the mating lapped surfaces of the seat member 30 and plate 53 is obtained only on the closed side of the valve, which would be the left hand side in the case of Figure 1.

In the event of failure of the pressure source to which line 22 is connected, the alternate pressure source to which line 21 is connected is started up, and as the pressure builds up on the left hand side of the shuttle assembly 31, the latter is shifted over to the right hand end of the bore 13 thereby closing the seat member 30 of fluid passage 28 and opening the left hand passage 27 to the bore. This switching of the hydraulic system to an alternate source of fluid pressure permits emergency operation of the flaps, landing gear, or other mechanism to get the airplane safely down onto the ground, or to accomplish other desired functions.

The many advantages of the present invention are believed to be self-evident to those skilled in the art from the foregoing description. The principal advantage of the shuttle construction disclosed herein is that it provides a practical method of producing a valve member having a cylindrical portion to accommodate an O-ring, which is a simple, convenient, and inexpensive means of sealing against leakage around the valve member; together with recessed flat surfaces that can be lapped to an optically flat finish so that a sealing contact engagement can be obtained with the lapped ends of spring-pressed seat members 30. Another advantage obtained as a result of using a lapped finish on the mating surfaces of the plate 53 and seat member 30 is that the seal thus obtained is absolutely tight against leakage for conditions ranging from very low to extremely high pressures. Also, a low coefficient of friction is obtained between the mating surfaces, and the shuttle assembly 31 therefore slides easily from one position to the other. The amount of friction may be varied as required to accomplish shuttling at various applied pressures by increasing or decreasing the load exerted by the springs 33.

While I have shown and described in considerable detail what I believe to be the preferred form of my invention, it is to be understood that such details are not restrictive and that various changes may be made in the shape and arrangement of the several parts without departing from the broad scope of the invention as defined in the appended claims.

I claim:

1. A shuttle valve comprising a body having a cylindrical bore formed therein, inlet ports communicating with said bore at opposite ends thereof, a pair of longitudinally spaced fluid outlet passages intersecting said bore at right angles thereto, a valve member slidably disposed within said bore for movement between two extreme positions, the center portion of said valve member being cylindrical to slidably fit said bore and the end portions thereof being cut away along one side to provide flat plate-supporting surfaces parallel to the longitudinal axis of the valve member, a pair of hardened and lapped plates mounted on said supporting surfaces and secured against movement relative thereto, a pair of movable tubular metallic seat members disposed within said fluid outlet passages, each of said members having a hardened and lapped end bearing against one of said plates in sealing contact therewith, each of said plates having a port formed in the top surface thereof opening laterally into said bore, the port in one of said plates being registered with its associated seat member when said valve member is at one position, and the port in the other plate being registered with its associated seat member when said valve member is at the other position, and means resiliently urging said seat members against their respective plates.

2. A shuttle valve comprising a body having a cylindrical bore formed therein, inlet ports communicating with said bore at opposite ends thereof, a pair of longitudinally spaced fluid outlet passages intersecting said bore at right angles thereto, a valve member slidably disposed within said bore for movement between two extreme positions, the center portion of said valve member being cylindrical to slidably fit said bore and the end portions thereof being cut away along one side to provide flat plate-supporting surfaces parallel to the longitudinal axis of the valve member, an O-ring seal encircling said cylindrical center portion of said valve member, a pair of hardened and lapped plates mounted on said supporting surfaces and secured against movement relative thereto, a pair of movable tubular metallic seat members disposed within said fluid outlet passages, each of said members having a hardened and lapped end bearing against one of said plates in sealing contact therewith, each of said plates having a port formed in the top surface thereof opening laterally into said bore, the port in one of said plates being registered with its associated seat member when said valve member is at one position, and the port in the other plate being registered with its associated seat member when said valve member is at the other position, said ports in said plates being spaced apart so that either one of said seat members is completely closed before the other seat member is cracked open, thereby preventing the interflow of fluid from one of said inlet ports to the other, and means resiliently urging said seat members against their respective plates.

VICTOR A. LARSEN.

REFERENCES CITED

The following references are of record in the file of this patent:

UNITED STATES PATENTS

| Number | Name | Date |
| --- | --- | --- |
| 709,491 | Kennedy | Sept. 23, 1902 |
| 910,163 | Benninghoff | Jan. 19, 1909 |
| 2,311,851 | McClure | Feb. 25, 1943 |
| 2,358,228 | Hoof | Sept. 12, 1944 |
| 2,394,487 | Rotter | Feb. 5, 1946 |
| 2,445,505 | Ashton | July 20, 1948 |